(12) United States Patent
Matsumura et al.

(10) Patent No.: US 8,668,862 B2
(45) Date of Patent: Mar. 11, 2014

(54) RESIN MOLDING METHOD, DIE DEVICE, AND RESIN MOLDED ARTICLE

(75) Inventors: Keizou Matsumura, Osaka (JP); Taishi Maruichi, Hyogo (JP)

(73) Assignee: Panasonic Corporation, Osaka (JP)

(*) Notice: Subject to any disclaimer, the term of this patent is extended or adjusted under 35 U.S.C. 154(b) by 320 days.

(21) Appl. No.: 13/102,567

(22) Filed: May 6, 2011

(65) Prior Publication Data
US 2011/0300330 A1 Dec. 8, 2011

(30) Foreign Application Priority Data

Jun. 7, 2010 (JP) ................................. 2010-129505

(51) Int. Cl.
*B29C 45/56* (2006.01)
*B29C 45/73* (2006.01)

(52) U.S. Cl.
USPC ............... 264/328.7; 264/328.12; 264/328.16

(58) Field of Classification Search
USPC .............................. 264/328.7, 328.12, 328.16
See application file for complete search history.

(56) References Cited

U.S. PATENT DOCUMENTS

| | | | | |
|---|---|---|---|---|
| 4,434,120 A | * | 2/1984 | Aloisio et al. | 264/155 |
| 4,836,960 A | * | 6/1989 | Spector et al. | 264/2.2 |
| 4,840,760 A | * | 6/1989 | Oishi | 264/245 |
| 5,376,317 A | * | 12/1994 | Maus et al. | 264/40.6 |
| 5,538,413 A | * | 7/1996 | Gardner et al. | 425/145 |
| 5,833,913 A | * | 11/1998 | Ellwood et al. | 264/328.7 |
| 6,203,731 B1 | * | 3/2001 | Kato et al. | 264/40.6 |
| 6,290,882 B1 | * | 9/2001 | Maus et al. | 264/2.2 |
| 2008/0118708 A1 | | 5/2008 | Shinohara et al. | |

FOREIGN PATENT DOCUMENTS

| | | |
|---|---|---|
| JP | 08-072067 | 3/1996 |
| JP | 2000-301583 | 10/2000 |
| JP | 2008-49652 | 3/2008 |

* cited by examiner

*Primary Examiner* — Jill Heitbrink

(74) *Attorney, Agent, or Firm* — Hamre, Schumann, Mueller & Larson, P.C.

(57) ABSTRACT

Flow gates 5 capable of protruding and retracting are provided in a cavity 9 of a die 2 to control a resin filling path. The generation of welds or orientation lines in a resin flow pattern is allowed only in an area containing uneven portions outside a design surface but is not allowed in other areas. The area containing welds or orientation lines in a resin flow pattern is covered with a separate component having a design surface, thereby achieving a desired metallic appearance.

3 Claims, 14 Drawing Sheets

RESIN MOLDING METHOD, DIE DEVICE, AND RESIN MOLDED ARTICLE

FIELD OF THE INVENTION

The present invention relates to resin molding methods for obtaining resin molded articles such as resin exterior components having design surfaces, and particularly relates to a resin molding method for obtaining a high-grade metallic appearance without forming welds or orientation lines in a resin flow pattern on a design surface, a die device used for the resin molding method, and a resin molded article obtained by the resin molding method.

BACKGROUND OF THE INVENTION

For example, Japanese Patent Laid-Open No. 2008-49652 proposes a resin molding method for obtaining a high-grade metallic appearance according to the related art, in which welds or orientation lines in a resin flow pattern are not formed on a design surface by glittering materials containing metallic compounds including aluminum, mica, and glass flakes. The technique of the resin molding method prevents a flow of molten resin into a cavity between dies from first reaching a shape affecting the design surface, so that the molten resin flowing to the design surface fills the cavity without being interrupted.

FIG. 12A is a front view showing the backside of the design of a resin molded article described as an invention on pages 5 to 8 and FIGS. 2, 3, and 7 of Japanese Patent Laid-Open No. 2008-49652. FIG. 12B is a sectional view taken along line A-A of FIG. 12A. FIG. 13A is a front view showing the backside of the design of a resin molded article described as a product of the related art in Japanese Patent Laid-Open No. 2008-49652. FIG. 13B is a sectional view taken along line B-B of FIG. 13A.

As shown in FIGS. 13A and 13B, in a resin molded article 100 of the related art, a rib 102 extending along the width of the resin molded article 100 and a rib 103 extending along the length of the resin molded article 100 directly protrude from the backside of a design surface 101. Molten resin is injected from a gate 104, which serves as a resin inlet, into a cavity formed by dies for fabricating the resin molded article 100 of the related art, and the molten resin flows to the design surface 101 from the rib 102 and the rib 103 and forms orientation lines in a resin flow pattern on the design surface 101, adversely affecting the design surface 101.

FIGS. 12A and 12B show a resin molded article 110 described as the invention of Japanese Patent Laid-Open No. 2008-49652, in which a rib 113 is widely extended on the backside of a design surface 111 along the length of the resin molded article 110 with ribs 112a, 112b, 112c, and 112d protruding from the backside of the design surface 111 so as to extend in the rib 113 along the width of the resin molded article 110. The rib 113 has a clearance from the design surface 111 except for the ribs 112a, 112b, 112c, and 112d. Thus in the resin molded article 110, molten resin injected into a cavity from a gate 114, which serves as a resin inlet in dies, is first applied to the design surface 111 through the rib 112a, and then the molten resin is applied to the rib 113 through the rib 112a. In this case, the molten resin applied from the rib 112a forms the rib 113; meanwhile, the molten resin passes through the thin and narrow ribs 112b, 112c, and 112d that are raised against the flowing direction, so that the molten resin cannot flow in a direction from the rib 113 to the design surface 111. Thus in the process of applying the molten resin toward the design surface 111, the flow of resin to the design surface 111 is interrupted (i.e., no resin flow joining from other points), which prevents welds and orientation lines in a resin flow pattern on the design surface 111.

As shown in FIG. 14, compounds 142 in a molding resin 141 are mostly arranged in certain directions by resin flows 143 and 144 during molding. At an interface 145 between the resin flows in different directions in a resin molding space in the dies, the directions of resin flows rapidly change, accordingly varying the flows of the compounds 142. The orientation lines are changes in the arrangement of the compounds 142 at the interface. Generally, such orientation lines occur on the appearances of resin molded articles made of resin materials containing metallic compounds (aluminum, mica, and glass flakes) that add metallic luster to the surfaces of the resin molded articles.

A high-grade metallic appearance can be obtained by other methods using glittering materials containing metallic compounds including aluminum, mica, and glass flakes, without forming welds or orientation lines in a resin flow pattern on a design surface. For example, such resin molding methods are proposed in pages 2 and 3 and FIGS. 1 to 4 of Japanese Patent Laid-Open No. 8-72067 and pages 2 and 3 and FIG. 3 and so on of Japanese Patent Laid-Open No. 2000-301583. In these resin molding methods, an uneven part is eliminated from the cavity of dies because an uneven part may divide or block a resin flow in a flow path when molten resin is injected into the cavity of dies. These methods can prevent welds and orientation lines in a resin flow pattern on a design surface.

FIG. 15 shows the resin molding method of Japanese Patent Laid-Open No. 8-72067. In this resin molding method, a boss portion is formed as a projection on a product (resin molded article) but as a recessed portion on a die. As shown in FIG. 15, a movable pin 122 is slidably disposed in a die (lower die) 121 to form the boss portion. Further, an elastic member 124 urging the movable pin 122 upward is provided on the underside of the movable pin 122. Reference numeral 123 in FIG. 15 denotes the other die (upper die). The dies 121 and 123 form a cavity 125 to be filled with resin. In this configuration, when molten resin passes through a point to be formed into the boss portion, the die 121 does not have any recessed portions facing the cavity 125. After the cavity 125 is filled with the molten resin, the pressure of the molten resin slides the movable pin 122 against the elastic member 124 so as to form a recess on the die 121. The boss portion on the product (resin molded article) is formed thus.

According to the resin molding method, even in the case where a design surface is formed to face, e.g., the other die (upper die) 123 in the cavity 125, a molten resin flow along the design surface is not disturbed because any recessed portions facing the cavity 125 are not provided on the die 121. These actions can obtain a product shape without forming welds or orientation lines in a resin flow pattern on the design surface.

FIG. 16 shows the resin molding method of Japanese Patent Laid-Open No. 2000-301583. Also in this resin molding method, a boss portion is formed as a projection on a product but as a recessed portion on a die. In the resin molding method of FIG. 16, however, movable pins 132 capable of protruding from a die (lower die) 131 are slidably disposed to form boss portions. Below the movable pins 132, drive units 134 are provided that protrude the movable pins 132 into a cavity 133 from the die 131. Reference numeral 135 in FIG. 16 denotes the other die (upper die) that forms the cavity 133 with the die (lower die) 131 during molding.

In this configuration, when molten resin passes through a point to be formed into the boss portion, the movable pins 132 are not protruded into the cavity 133. After the cavity 133 is filled with the resin, the movable pins 132 are protruded into the cavity 133 by the driving units 134 to form recessed portions on a resin molded article. Thus even in the case where a design surface is formed to face the other die (upper die) 135 in the cavity 133, a molten resin flow along the design surface is hardly disturbed, achieving a product shape without forming welds or orientation lines in a resin flow pattern on the design surface.

DISCLOSURE OF THE INVENTION

In the resin molding method (the resin molding method of the related art) of Japanese Patent Laid-Open No. 2008-49652, a high-grade metallic appearance of glittering materials is obtained on the design surface of a product (resin molded article) without forming welds or orientation lines in a resin flow pattern. To obtain such an appearance, in the process of flowing molten resin in a cavity, a flow of molten resin from the outside of the design surface 111 to the design surface 111 is restricted to joining molten resin having flown along the design surface 111 from the gate 114, which serves as the resin inlet, thereby preventing welds and orientation lines in a resin flow pattern. Thus in the resin molding method, in the case where a path in the cavity containing molten resin flowing along the design surface 111 has a recessed portion or a projecting portion (uneven portion) that may interfere with a flow or a split flow of resin, it is not possible to eliminate a disturbed flow of the resin to prevent welds and orientation lines in a resin flow pattern.

Specifically, in the case where the design surface 111 of a product has a hole such as a circular hole, molten resin flowing along the design surface in the cavity of dies is split in two directions at a projecting portion corresponding to the hole and joins again after passing over the projecting portion, resulting in welds or orientation lines in a resin flow pattern at the junction. Further, in the case where a product has a recessed portion interfering with a resin flow, that is, a die has a projecting portion, a resin flow is blocked and thus results in welds or orientation lines in a resin flow pattern on the design surface 111.

In the resin molding methods of Japanese Patent Laid-Open No. 8-72067 and Japanese Patent Laid-Open No. 2000-301583 of the related art, uneven portions that may interfere with a flow or a split flow of resin in the flowing paths of molten resin into the cavities 125 and 133 are eliminated in the cavities 125 and 133, thereby preventing disturbed resin flows leading to welds or orientation lines in a resin flow pattern on the design surface.

In the resin molding methods of Japanese Patent Laid-Open No. 8-72067 and Japanese Patent Laid-Open No. 2000-301583 of the related art, however, a hole such as a circular hole on the design surface of a product corresponds to a projecting portion and molten resin flowing along the design surface in each of the cavities 125 and 133 of the dies 121, 123, 131, and 135 is split in two directions at the projecting portion. The molten resin joins again after passing over the projecting portion, resulting in welds or orientation lines in a resin flow pattern at the junction.

In the resin molding method of Japanese Patent Laid-Open No. 2000-301583 of the related art, the drive unit 134 protrudes the movable pin 132 into the cavity 133 filled with resin, so that a recessed portion is formed on a product. In this case, the movable pin 132 is moved to the bottom of the cavity 133 during the passage of molten resin in the cavity 133, so that the cavity 133 does not have a projecting portion corresponding to a hole and a hole can be obtained on the finished product without splitting or disturbing a resin flow. However, in the case where the hole has a large area, the drive unit 134 for moving the movable pin 132 requires an extremely large force. In the case of an insufficient force, the molten resin cannot be completely pressed at a hole and the hole may have a defective shape. Another conceivable technique is to form a hole by punching in the dies after the injection of molten resin. This technique, however, is not rational because the technique may require time-consuming subsequent treatment and a hole may be formed in an undesirable state.

The present invention has been devised to solve the problems of the related art. An object of the present invention is to provide a resin molding method, a die device, and a resin molded article which can obtain a high-grade appearance without forming welds or orientation lines in a resin flow pattern on a design surface, even in the case where a cavity has a projecting die portion that may split or interfere with a flow of molten resin in a path of the molten resin in the cavity.

In order to attain the object, the resin molding method of the present invention is a resin molding method of injecting molten resin into a cavity formed between opposed dies to form a resin molded article, the resin molding method including the steps of: increasing the temperature of at least a die surface facing the cavity to at least the glass transition temperature of resin; injecting the molten resin into the cavity in a state in which at least one flow gate for restricting a resin flow is protruded into the cavity to restrict the resin flow to a predetermined restricted area, the at least one flow gate being capable of protruding and retracting into/from the cavity; removing a restriction by retracting the flow gates from the cavity to a position not restricting the resin flow after the start of injection in the injecting step; cooling and solidifying the resin in the cavity; and collecting the solidified resin from the dies to obtain a resin molded article.

Further, the restricted area is an uneven portion forming area containing an uneven portion that splits or blocks the resin flow in the cavity.

According to this method, even in the case where welds or orientation lines in a flow pattern occur at the junction of resin flowing into the cavity, the flow gates are retracted afterward to allow the resin at the joint to flow into the restricted area, thereby preventing welds and orientation lines in a resin flow pattern from occurring outside the restricted area. Even in the case where a resin molded article has an uneven portion and a die cavity includes a projecting portion or a recessed portion corresponding to the uneven portion, welds or orientation lines in a resin flow pattern occur only at the uneven portions of the resin molded article and are prevented from occurring on the design surface of the resin molded article. Further, the temperature of at least the die surface facing the cavity is increased to at least the glass transition temperature of the resin, thereby preventing welds at the joint of resin flowing into the cavity.

Moreover, the at least one flow gate includes multiple flow gates provided in zones, the flow gates protruding into the cavity to restrict the resin flow to the restricted area and retracting from the cavity to pass the resin into the restricted area, the flow gates being sequentially retracted first from the zone closest to the junction of the restricted resin flow.

According to this method, the protruded flow gates are sequentially retracted first from the zone closest to the junction of the restricted resin flow, so that the resin flows into the restricted area from a portion having a low resin fluid pressure. The resin flows from the terminal zone near the junction and then uniformly flows into the restricted area from the periphery of the restricted area, so that welds or orientation lines in a flow pattern do not occur on a design surface outside the restricted area.

Moreover, a junction gate is provided at the junction of resin, the junction gate being capable of protruding and retracting into/from the cavity and setting a joint surface to join the resin flow.

According to this method, the joint surface for joining the resin flow in the cavity can be set without leaving welds or orientation lines in a resin flow pattern on the junction.

A die device according to the present invention is a die device including a pair of dies detachably opposed to each other, the dies forming a cavity filled with molten resin; and flow gates capable of protruding and retracting into/from the cavity, wherein the flow gates protrude into the cavity to block a resin flow to a predetermined restricted area at the start of injection of resin into the cavity, and the flow gates retract from the cavity to allow the passage of the resin flow into the restricted area when the resin joins outside the restricted area.

The die device according to the present invention further includes a junction gate capable of protruding and retracting into/from the cavity, the junction gate protruding into the cavity to set a junction surface of the resin when the resin joins outside the restricted area.

The die device configured thus can satisfactorily implement the resin molding method.

A resin molded article according to the present invention includes a design surface area and an uneven area containing uneven portions such as a rib, a boss, and a hole, wherein the uneven area contains at least one of a weld and an orientation line in a resin flow pattern and is covered with a separate component.

The resin molding method of the present invention can achieve a high-grade metallic appearance without forming welds or orientation lines in a resin flow pattern on the design surface of an exterior component, the resin molding method eliminating the need for subsequent treatment such as painting.

DESCRIPTION OF THE EMBODIMENTS

The following will describe embodiments of the present invention with reference to the accompanying drawings.
(First Embodiment)

Figure 1:
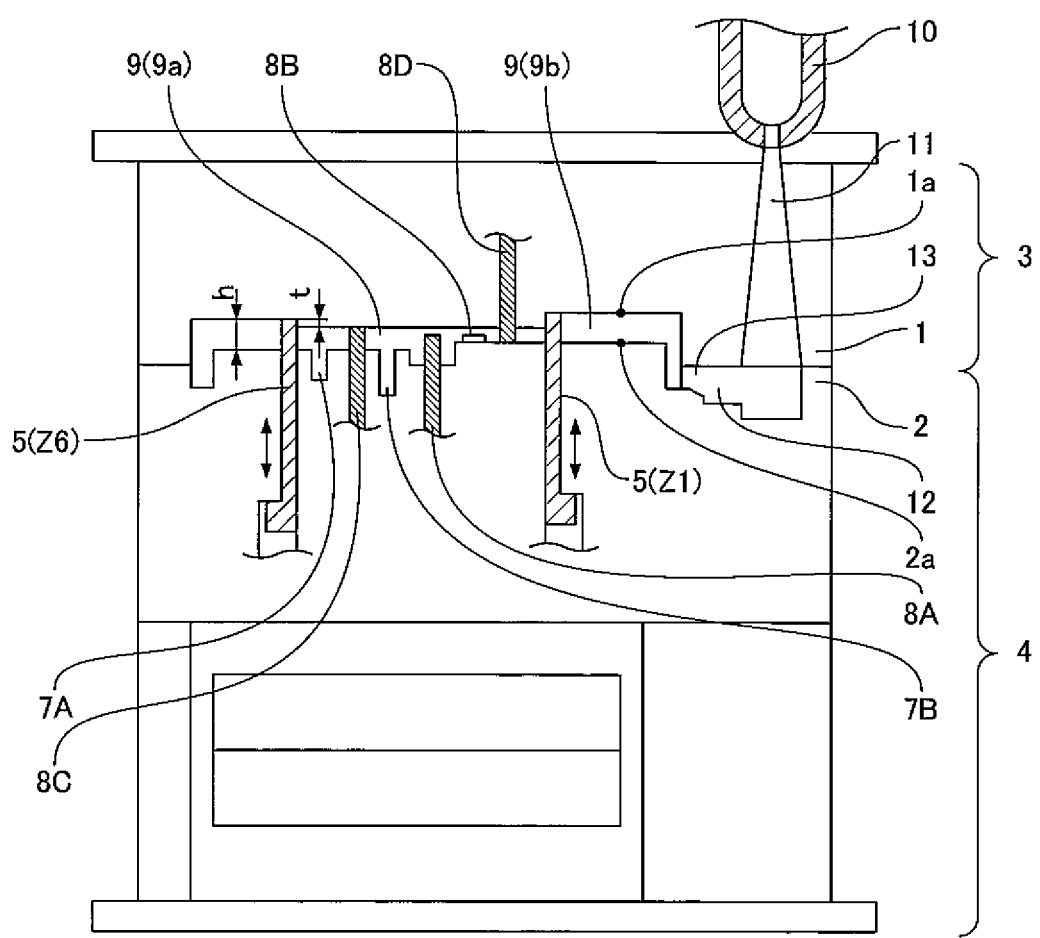
FIG. 1 is a front sectional view showing a die device used for a resin molding method according to a first embodiment of the present invention.
Figure 2:
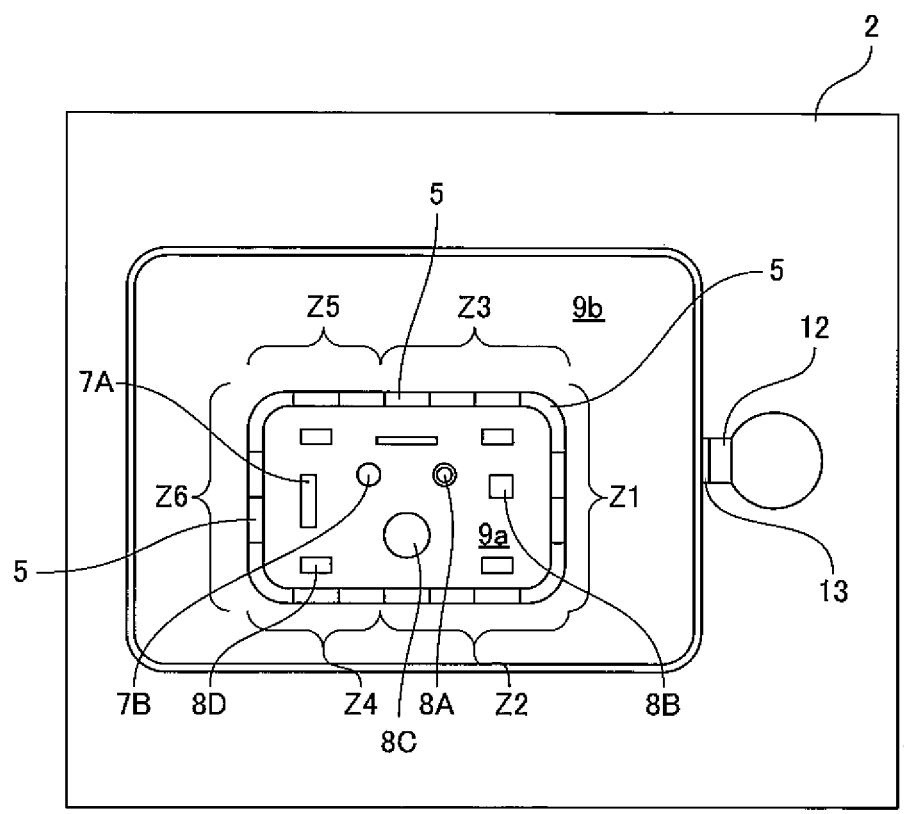
FIG. 2 is a plan view showing the die device (movable die) used for the resin molding method according to the first embodiment.
Figure 3:
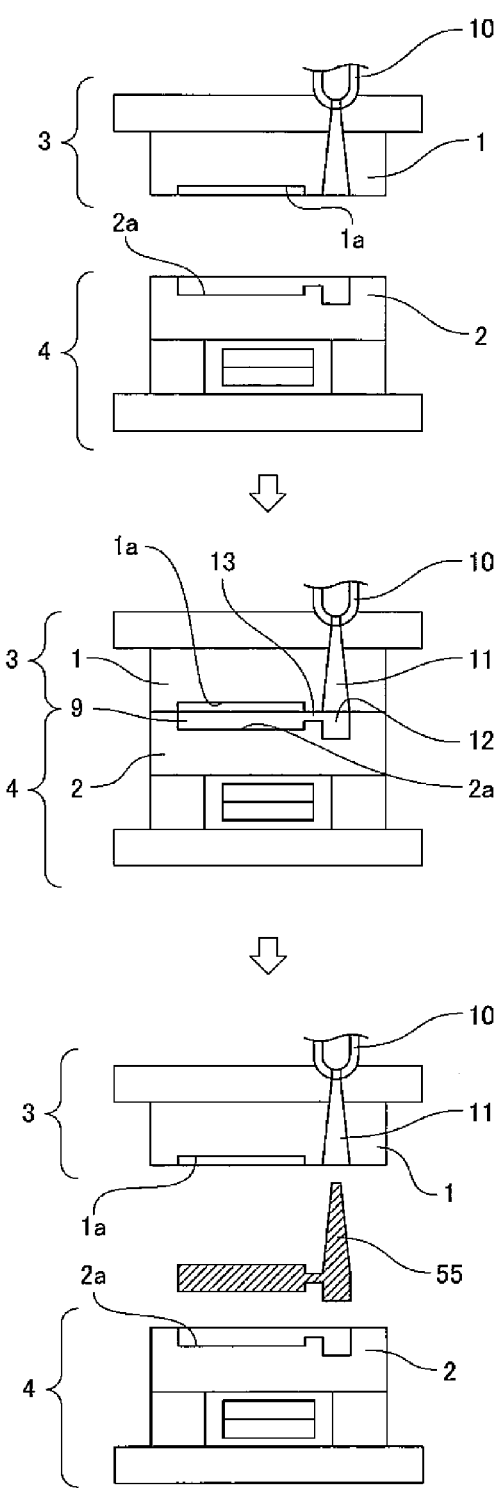
FIG. 3 shows front vertical sections of the schematic steps of the resin molding method according to the first embodiment.
Figure 4:
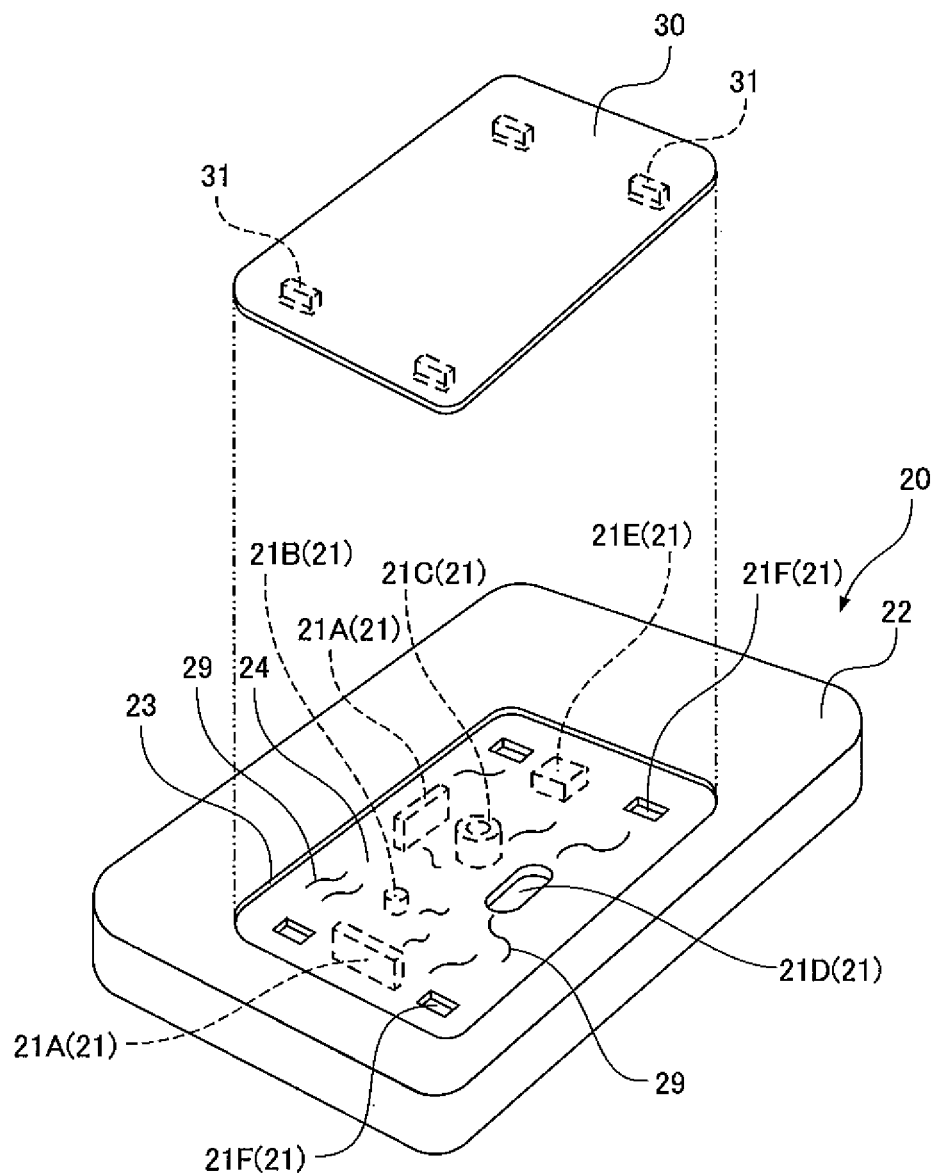
FIG. 4 is a perspective view showing a resin molded article fabricated by the resin molding method according to the first embodiment of the present invention.
Figure 5:
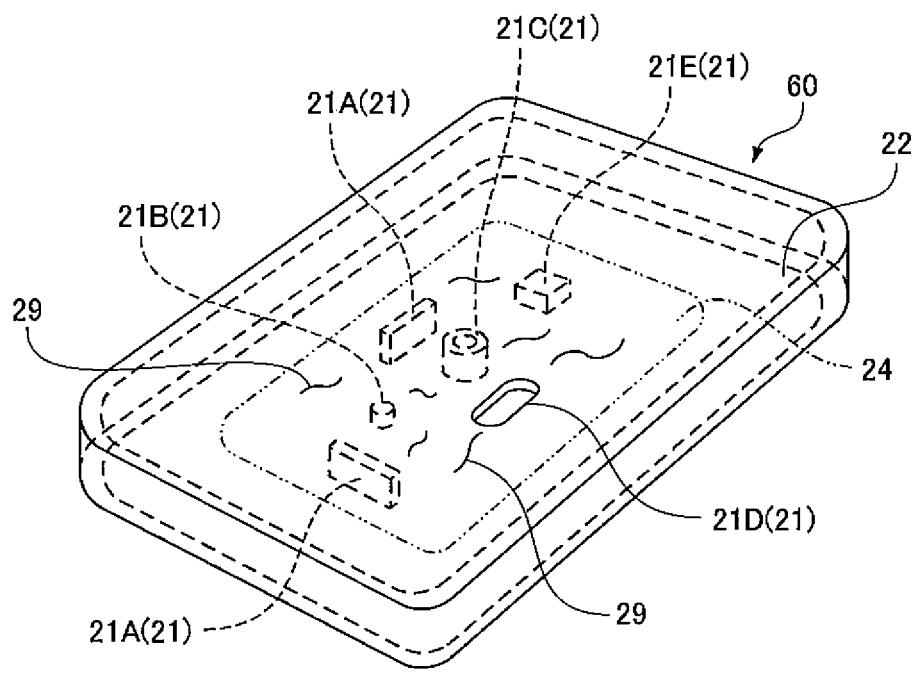
FIG. 5 is a perspective view showing a resin molded article of the related art.
Figure 6A:
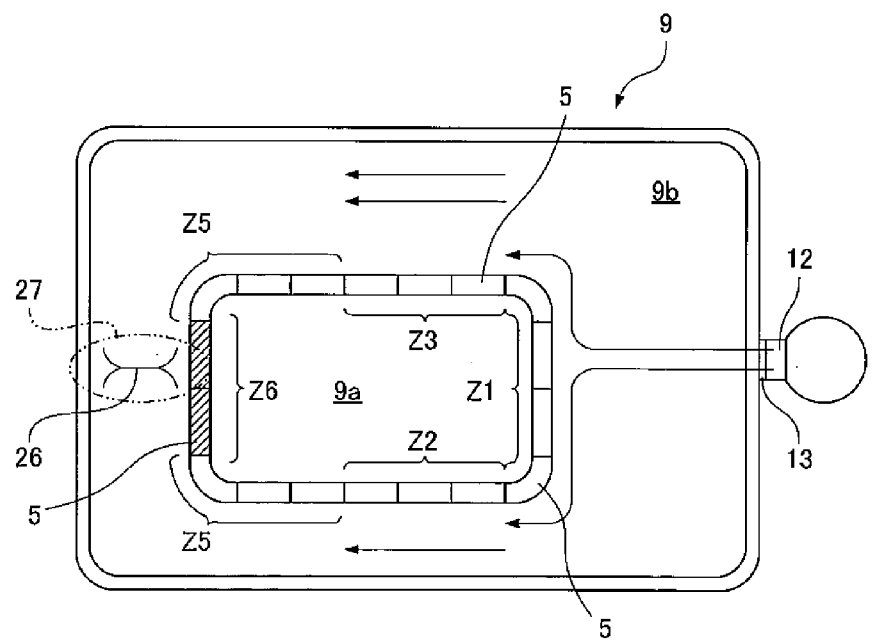
FIG. 6A is a plan view showing the movable die in the steps of the resin molding method according to the first embodiment.
Figure 6B:
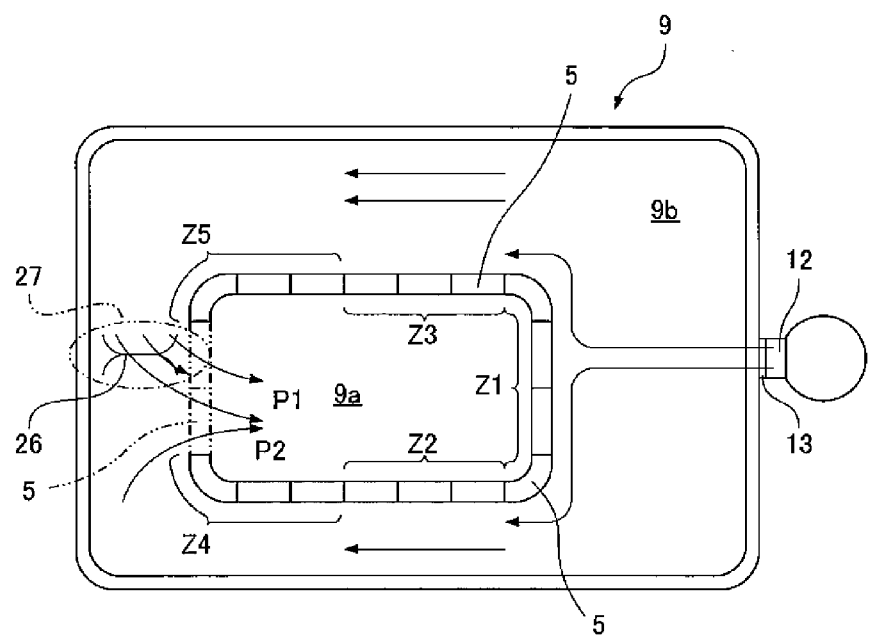
FIG. 6B is a plan view showing the movable die in the steps of the resin molding method according to the first embodiment.
Figure 7:
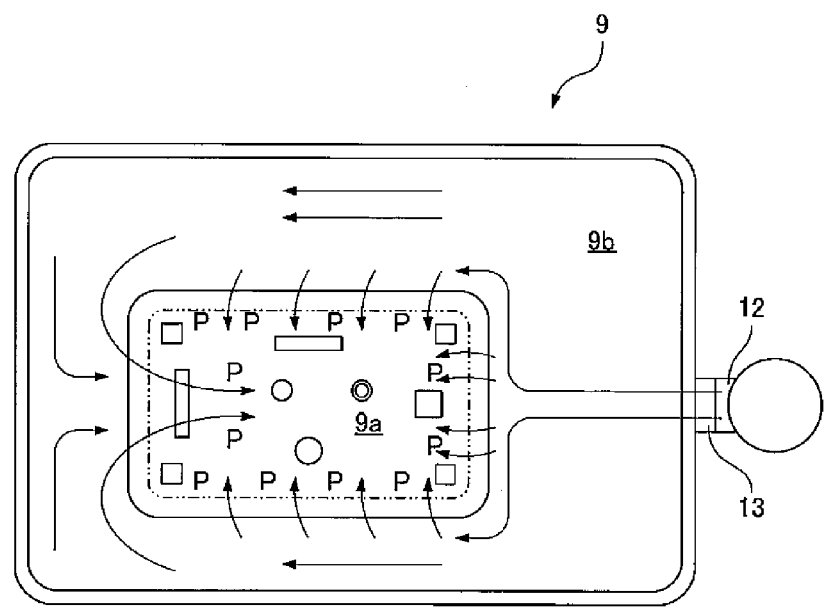
FIG. 7 is a plan view showing the movable die in the steps of the resin molding method according to the first embodiment and a second embodiment.

FIG. 1 is a front sectional view showing a die device used for a resin molding method according to a first embodiment of the present invention. FIG. 2 is a plan view showing a movable die according to the first embodiment. FIG. 3 shows front sectional views of the schematic steps of the resin molding method according to the first embodiment. FIG. 4 is a perspective view showing a resin molded article fabricated by the resin molding method according to the first embodiment of the present invention. FIG. 5 is a perspective view showing a resin molded article according to the related art. FIGS. 6A, 6B, and 7 are plan views showing the movable die in the steps of the resin molding method according to the first embodiment.

Referring to FIG. 4, the following will first describe the resin molded article fabricated by the resin molding method according to the first embodiment of the present invention.

Reference numeral 20 in FIG. 4 denotes the resin molded article fabricated by the resin molding method according to the embodiment of the present invention. The resin molded article 20 includes a design surface 22 having a high-grade metallic appearance of glittering materials containing metallic compounds including aluminum, mica, and glass flakes. In addition to the design surface 22 of the resin molded article 20, the resin molded article 20 includes an uneven area 24 that is slightly recessed with a step 23 (thickness t) in the present embodiment. The uneven area 24 is a restricted area containing multiple uneven portions 21 for attaching other components. The uneven portions 21 in the uneven area 24 include a rib 21A, bosses 21B and 21C, a hole 21D and a hollow (recess) 21E which serve as escape portions during resin molding, and pierced portions 21F for attaching a cover 30, which will be described later. The uneven area 24 of the resin molded article 20 is covered with the cover 30 having an exterior design surface. The backside of the cover 30 has multiple claws 31 for attaching the cover 30 to the resin molded article 20. The ends of the claws 31 are engaged with the pierced portions 21F for cover attachment in the uneven area 24 of the resin molded article 20.

Referring to FIGS. 1 and 2, the following will describe the die device used for the resin molding method according to the first embodiment of the present invention.

As shown in FIGS. 1 and 2, the die device includes a fixed die device 3 having a fixed die 1 as a first die and a movable die device 4 having a movable die 2 as a second die. The fixed die 1 and the movable die 2 are opposed to each other. Relative to the fixed die 1, the movable die 2 is movably disposed between a contact position and a separated position. Further, the fixed die 1 and the movable die 2 form a cavity 9 to be filled with molten resin when the dies are contacted with each other. The fixed die 1 has a surface part 1a facing the cavity 9 and the surface part 1a has a design forming surface for forming the design surface 22 of the resin molded article 20. In FIG. 1 and so on of the first embodiment, the fixed die device 3 having the fixed die 1 as the first die is placed on the movable die device 4 having the movable die 2 as the second die. The present embodiment is not limited to this configuration and thus the die devices may be vertically reversed or laterally opposed to each other.

A nozzle 10 of an injection molding machine for injecting molten resin is bonded (attached) to the fixed die device 3. The fixed die 1 includes a heater (not shown) for heating the surface part 1a, which faces the cavity 9 on the fixed die 1, to at least the glass transition temperature of resin (Tg point). The movable die 2 includes a heater for heating a surface part 2a, which faces the cavity 9 on the movable die 2, to at least the glass transition temperature of resin (Tg point).

In the fixed die 1 and the movable die 2, a sprue 11, a runner 12, and a gate 13 are formed to feed molten resin into the cavity 9. Further, on the fixed die 1 and the movable die 2, recessed portions 7A and 7B and projecting portions 8A, 8B, 8C, and 8D for forming the uneven portions 21 in the uneven area 24 of the resin molded article 20 are formed so as to face the cavity 9. In other words, the recessed portion 7A for forming the rib 21A, the projecting portion 8A for forming the hole of the boss 21B, the recessed portion 7B for forming the boss 21C, the projecting portion 8C for forming the hole 21D, the projecting portion 8B for forming the hollow 21E serving as an escape portion, and the projecting portions 8D for forming the pierced portions 21F are provided so as to face the cavity 9 on the fixed die 1 and the movable die 2.

Additionally, the movable die 2 has flow gates 5 in multiple insert blocks for blocking a resin flow. The flow gates 5 can protrude and retract into/from the cavity 9. The flow gates 5 are aligned with the boundary (at the step 23) between the design surface 22 and the uneven area 24 of the resin molded article 20 in the cavity 9 and can protrude and retract around a part corresponding to the uneven area 24 in the cavity 9 (the part will be referred to as an uneven portion forming area 9a). With this configuration, molten resin flowing into the cavity 9 is prevented from directly flowing into the uneven portion forming area 9a from an area outside the uneven portion forming area 9a (the area will be referred to as a design surface forming area 9b) in the cavity 9. The flow gates 5 have zones Z1 to Z6 (see FIG. 2) divided along the flowing direction of resin. The protrusion and retraction of the flow gates 5 in the zones Z1 to Z6 into/from the cavity 9 can be controlled in a separate manner.

The following will schematically explain the resin molding method according to the first embodiment of the present invention.

The resin molding method according to the embodiment of the present invention includes: a temperature increasing step (see the upper part and the central part of FIG. 3: clamping/temperature increasing step) of increasing the temperatures of the fixed die 1 serving as the first die and the movable die 2 serving as the second die and clamping the dies; an injecting step of disposing the flow gates 5, which can protrude and retract into/from the cavity 9 on the movable die 2, in a state in which a resin'flow path is restricted (a molten resin flow to the uneven portion forming area 9a is restricted, the uneven portion forming area 9a serving as a restricted area) and injecting the molten resin into the cavity 9; a restriction release step of moving the flow gates 5 to positions not interfering with (restricting) a resin flow after the start of injection in the injecting step (when resin flowing in the cavity 9 joins); a solidifying step of cooling and solidifying the resin in the cavity 9; and a collecting step (see the lower part of FIG. 3) of collecting the solidified resin from the fixed die 1 and the movable die 2 to obtain a desired resin molded article 55 (resin molded article 20).

In the temperature increasing step, the fixed die 1 and the movable die 2 are contacted with each other before an injecting operation of the injection molding machine. At this point, at least the surface parts (surfaces facing the cavity 9) 1a and 2a of the fixed die 1 and the movable die 2 are heated to at least the glass transition point (Tg point) of resin and are kept at the temperature.

In the restricted state, the resin flow gates 5 that protrude and retract on the surface part 2a of the movable die 2 are set beforehand to protrude to a height h of the cavity, that is, to the surface part 1a of the fixed die 1, so that resin flowing in the cavity 9 does not pass through the uneven portion forming area 9a that may disturb a resin flow.

In the injecting step, molten resin is injected into the cavity 9 between the fixed die 1 and the movable die 2 from the nozzle 10 of the injection molding machine through the sprue 11, the runner 12, and the gate 13 by an injection cylinder (not shown) of the injection molding machine.

In the restriction release step, in order to obtain an optimum flow according to a resin flowing state, the zones of the flow gates 5 are respectively controlled so as to sequentially retract to the surface part 2a of the movable die 2 according to a flow of resin (when resin flowing in the cavity 9 joins), so that the flow gates 5 interfering with a resin flow path are completely retracted to allow the passage of resin into the uneven portion forming area 9a.

In the solidifying step, the molten resin is applied into the cavity 9 containing the uneven portion forming area 9a, and then the fixed die 1 and the movable die 2 are cooled for a predetermined time to the glass transition temperature (Tg point) of the molten resin to solidify the resin.

In the molded article collecting step, the movable die 2 is moved to separate the movable die 2 from the fixed die 1 and the solidified resin is collected to obtain the desired resin molded article 55. After that, an unwanted part is removed from the resin molded article 55 to obtain the finished resin molded article 20.

Even in the case where the resin molded article 20 fabricated by the resin molding method has defective portions 29 such as welds and orientation lines in a resin flow pattern, the defective portions 29 occur only in the uneven area 24 covered with the cover 30, thereby satisfactorily keeping the high-grade metallic appearance of the resin molded article 20 covered with the cover 30.

The resin molding method and the resin molded article 20 will be more specifically described below according to the first embodiment of the present invention.

The following will describe differences between the resin molded article 20 fabricated by the resin molding method of the present invention and a typical resin molded article 60 of the related art. FIG. 5 shows the typical resin molded article 60 of the related art. As in the resin molded article 20 of the present embodiment, the resin molded article 60 has a design surface 22 on the appearance and includes uneven portions 21 (such as a rib 21A, bosses 21B and 21C, a hole 21D, and a hollow (recess) 21E) for attachment to other components. In the resin molded article 60 of the related art, however, the uneven portions 21 are directly placed on the backside of the design surface 22 of the resin molded article 60, unlike in the resin molded article 20 of the present embodiment. In the case where the uneven portions 21 are necessary for attachment to other components, the uneven portions 21 cause defective portions 29 such as welds and orientation lines in a resin flow pattern during molding, thereby reducing the quality of the design surface 22.

Thus in the resin molded article 20 of the present embodiment, as shown in FIG. 4, the defective portions 29 such as welds and orientation lines in a resin flow pattern do not appear on the design surface 22 on the appearance of the resin molded article 20 but appear only in the uneven area 24 containing the uneven portions 21 (including the rib 21A, the bosses 21B and 21C, the hole 21D, the hollow (recess) 21E, and the pierced portions 21F) for attachment to other components. In order to obtain the design surface 22 with a predetermined appearance, the step 23 is formed at the boundary between the uneven area 24 and the design surface 22, and the cover 30, which is a separate component with a design surface, is fit onto the uneven area 24. Thus the uneven area 24 is concealed that contains the defective portions 29 such as welds and orientation lines in a resin flow pattern. Consequently, a metallic appearance is obtained over the surface of the resin molded article 20 without forming the defective portions 29 such as welds and orientation lines in a resin flow pattern on the design surface (the design surface 22 of the resin molded article 20 and the design surface of the cover 30).

Generally, in the molding of the design surface of glittering materials containing metallic compounds including aluminum, mica, and glass flakes, molten resin always flows into the uneven portion forming area 9a (corresponding to the uneven area 24 of the resin molded article 20) containing the uneven portions 21 in the cavity 9, and then the molten resin flows into the design surface forming area 9b that is a surface appearance area outside the uneven portion forming area 9a. At this moment, an interrupted or split flow of resin in the uneven portion forming area 9a leads to the defective portions 29 such as welds and orientation lines in a resin flow pattern in the design surface forming area 9b. Even if the cover 30, which is a separate cover component for concealment, is attached on the uneven area 24 corresponding to the uneven portion forming area 9a, the design surface with a predetermined appearance cannot be obtained over the surface of the resin molded article 20.

To address this problem, in the embodiment of the present invention, the resin molding method allows the occurrence of the defective portions 29 such as welds and orientation lines in a resin flow pattern only in the uneven area 24 corresponding to the uneven portion forming area 9a. The embodiment of the resin molding method will be more specifically described below.

As has been discussed, in FIG. 1, the flow gates 5 in the insert blocks are provided on the movable die 2 opposed to the fixed die 1 such that the flow gates 5 can separately protrude and retract between the height h of the cavity 9 (at the surface part 1a of the fixed die 1) and the surface part 2a of the movable die 2.

As shown in FIG. 4 and so on, the uneven area 24 containing the uneven portions for attachment of other components has the step height t (step 23) relative to the design surface 22 provided over the appearance of the resin molded article 20, and the separate cover 30 having a design surface is fit onto the uneven area 24. The flow gates 5 arranged on the movable die 2 capable of separately protruding and retracting (sliding) are aligned with the boundary between the uneven portion forming area 9a (corresponding to the uneven area 24 of the resin molded article 20) and the design surface forming area 9b of the cavity 9. This configuration prevents a molten resin flow in the cavity 9 from directly flowing into the uneven portion forming area 9a.

As shown in FIG. 2, the flow gates 5 in the zones Z1 to Z6 (six zones in the present embodiment) can separately protrude and retract along a resin flow path from the gate 13 acting as the inlet of molten resin. The molten resin injected from the gate 13 is split by the flow gates 5 in two directions in the design surface forming area 9b of the cavity 9. The molten resin split in two directions joins at the end of the flow and causes a junction 27 as shown in FIG. 6A. The junction 27 temporarily has welds or orientation lines 28 in a resin flow pattern. The junction 27 depends on the volume of the split resin in the cavity 9. A smaller volume of the resin is applied faster and the junction 27 is determined. The junction 27 can be predicted by, e.g., a flow analysis and thus the flow gates 5 corresponding to the junction 27 are set as the terminal zone Z6.

As shown in FIG. 6A, the flow gates 5 in the terminal zone Z6 are asymmetrical with respect to the junction 27 of resin. The flow gates 5 in the zone Z6 are asymmetrically set by deviating the center of the flow gates 5 in the terminal zone Z6 from the junction 27, so that a molten resin flow first reaching the junction 27 mainly flows into the flow gates 5 in the terminal zone Z6.

Referring to FIG. 6A and so on, the allocation of the zones of the flow gates 5 will be described below. FIG. 6B shows the flowing process of molten resin. The protrusion and retraction of the flow gates 5 are controlled as follows: in the zone Z1 next to the gate 13 serving as the inlet of molten resin, the zones Z2 to Z5 along the passage of molten resin, and the terminal zone Z6, the flow gates 5 are protruded at the start of injection of molten resin to the height h of the cavity 9 (until the flow gates 5 come into contact with the surface part 1a of the fixed die 1) by a drive unit (not shown) for protruding and retracting the flow gates 5, so that the molten resin flows only in the design surface forming area 9b but does not flow over the flow gates 5 into the uneven portion forming area 9a.

Molten resin is injected from the gate 13 serving as the inlet of the molten resin, and then the molten resin is split by the flow gates 5 and flows in the design surface forming area 9b having been set by the flow gates 5. When the molten resin joins near the terminal zone Z6, a zone for joining split molten resin, only the flow gates 5 in the terminal zone Z6 are immediately moved and retracted to the surface part 2a of the movable die 2 (in other words, the flow gates 5 are not protruded into the cavity 9), so that the molten resin flows over the flow gates 5 into the uneven portion forming area 9a of the cavity 9 from the terminal zone Z6. At this moment, the flow gates 5 in the zone Z6 are disposed asymmetrically to the junction 27 of molten resin, producing the following effect: when the flow gates 5 retract from the cavity 9, the molten resin flows into the uneven portion forming area 9a of the cavity 9; meanwhile, the molten resin joins at the junction 27 and thus generates welds or orientation lines 26 in a resin flow pattern. At the junction 27, welds or the orientation lines 26 in a resin flow pattern temporarily occur but are reduced by a resin flow into the uneven portion forming area 9a of the cavity 9. This effect is obtained by setting the center of the flow gates 5 in the terminal zone Z6 asymmetrically to the junction 27, so that as shown in FIG. 6B, molten resin flows into the uneven portion forming area 9a at an angle of P1 direction with respect to the line of the junction 27. Further, the flow gates 5 in the zone Z6 are asymmetrically disposed such that a larger volume of split molten resin in the cavity has a small inlet in the zone Z6 of the flow gates 5. Thus at the junction 27, a larger volume of molten resin flows in P1 direction than in P2 direction, thereby reliably reducing welds or the orientation lines 26 in a resin flow pattern. Moreover, only the flow gates 5 in the terminal zone Z6 are first retracted in response to molten resin flowing into the uneven portion forming area 9a, so that the resin flows only from the terminal zone Z6 and ensures resin flows in P1 and P2 directions.

After that, the flow gates 5 in the zones Z5, Z4, Z3, Z2, and Z1 are sequentially retracted starting from the zone Z5 closest to the end of the flow, before the molten resin flow from the terminal zone Z6 fills the uneven portion forming area 9a. Thus the flow gates 5 surrounding the uneven portion forming area 9a are completely retracted and the molten resin flows over the uneven portion forming area 9a. The injection of the molten resin into the uneven portion forming area 9a is completed thus. In this case, the uneven portion forming area 9a of the cavity 9 contains the projecting portions 7A and 7B and the recessed portions 8A to 8D that interrupt or split the molten resin, so that welds or the orientation lines 26 (defective portions 29) in a resin flow pattern occur in the uneven portion forming area 9a. As shown in FIG. 7, when resin flows into the uneven portion forming area 9a from the boundary between the uneven portion forming area 9a and the design surface forming area 9b of the cavity 9, the molten resin sequentially flows from the terminal zone Z6 to the zones Z5 to Z1 near the terminal zone Z6, that is, from a part having a small resin fluid pressure. After flowing from the terminal zone Z6, the molten resin uniformly flows over the uneven portion forming area 9a, so that the resin does not join in the design surface forming area 9b having a design surface and orientations or orientation lines in a resin flow pattern do not occur in the design surface forming area 9b. Reference character P in FIG. 7 denotes the flowing directions of resin into the uneven portion forming area 9a from the boundary between the uneven portion forming area 9a and the design surface forming area 9b of the cavity 9.

In this case, the retraction timing of the flow gates 5 from the cavity 9 in the zones Z1 to Z6 is schematically set after the determination of the injection molding conditions such as a filling time. Further, reduced welds and orientation lines in a resin flow pattern are confirmed on a prototype of the resin molded article 20 and then the retraction timing is adjusted, achieving the predetermined resin molded article 20 without forming welds or orientation lines in a resin flow pattern. The flow gates 5 in the slidable insert blocks can be freely combined with one another and thus enable an adjustment in the most suitable state.

Figure 8:
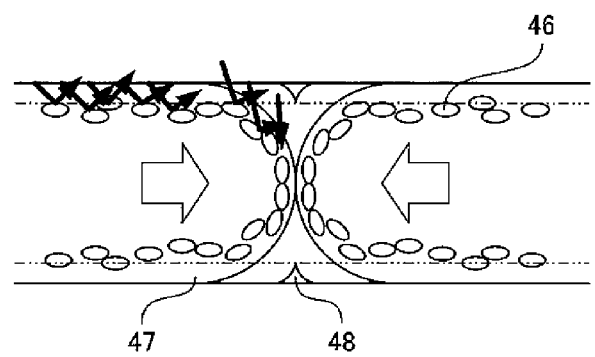
FIG. 8 is a sectional view showing a mechanism of generating orientation lines.

FIG. 8 shows the mechanism of generating orientation lines in a resin flow pattern at the junction. As shown in FIG. 8, metallic compounds 46 travel orthogonally to the flowing direction and thus reflect light differently from a flowing part, generating orientation lines. At this moment, even if a flowing force is applied to the junction to flow resin in a different direction, a surface solidification layer is formed on a skin layer 47, which is in direct contact with a die surface, and causes orientation lines in a resin flow pattern. Since the surface solidification layer does not flow, the orientation lines cannot be reduced. In the embodiment of the present invention, the surface parts 1a and 2a of the dies 1 and 2 are heated to at least the glass transition temperature (Tg point) of resin to delay the formation of the surface solidification layer, thereby eliminating the orientation lines in a resin flow pattern at the junction. Consequently, the present embodiment can completely eliminate the orientation lines at the resin junction at the end of a flow.

A gap may be formed between the insert blocks of the flow gates 5. The size of the gap is not limited as long as molten resin flowing into the uneven portion forming area 9a from a gap does not flow back to the design forming area 9b from another gap.

In order to obtain a high-grade metallic appearance without forming welds or orientation lines in a resin flow pattern on the design surface of the appearance, it is necessary to apply resin without passing through projecting portions or recessed portions that may interfere with a flow of resin. The method of the first embodiment is quite suitable for attaining the object. Further, a flowing force of resin to the junction 27 can eliminate orientation lines in a resin flow pattern at the junction 27. On the finished resin molded article 20, a hole is not necessary on the cover 30 that conceals the uneven portion forming area 9a containing the defective portions 29 such as welds and orientation lines in a resin flow pattern. Thus the techniques of Japanese Patent Laid-Open No. 2008-49652, Japanese Patent Laid-Open No. 8-72067, and Japanese Patent Laid-Open No. 2000-301583 can easily form a satisfactory design surface without forming welds or orientation lines in a resin flow pattern, which does not constitute an obstacle to the present invention.

As has been discussed, according to the first embodiment, even if the appearance includes the uneven portions 21 such as a hole, it is possible to obtain a high-gloss metallic appearance without forming welds or orientation lines in a resin flow pattern (defective portions 29) on the design surface 22. Consequently, even a resin molded article having a complicated shape can have a metallic appearance without the need for painting.

The first embodiment described the resin molded article having the single gate 13 but the present invention is not limited to this configuration. Also in the case where the gates 13 are provided at multiple points, the flow gates 5 may be disposed at the junction of resin and the driving of the flow gates 5 may be controlled with the same configuration and resin molding method as the flow gates 5 in the terminal zone Z6.

In the first embodiment, the flow gates 5 are assembled on the movable die 2. In the case where the movable die 2 has a metallic appearance surface as a design surface forming surface, the flow gates 5 are assembled on the fixed die 1 to implement the same configuration and method. Further, a design surface may be provided on either the fixed die 1 or the movable die 2. Points of welds or orientation lines in a resin flow pattern are located and another component having a design surface is assembled onto the located points by the same configuration and method, so that the flow gates 5 may be disposed on either the fixed die 1 or the movable die 2.

(Second Embodiment)

Referring to FIGS. 9 to 11B and 4, 7, and so on, the following will describe a resin molding method and a resin molded article according to a second embodiment of the present invention. Constituent elements having the same functions as in the first embodiment will be indicated by the same reference numerals and the explanation thereof is omitted.

Figure 9:
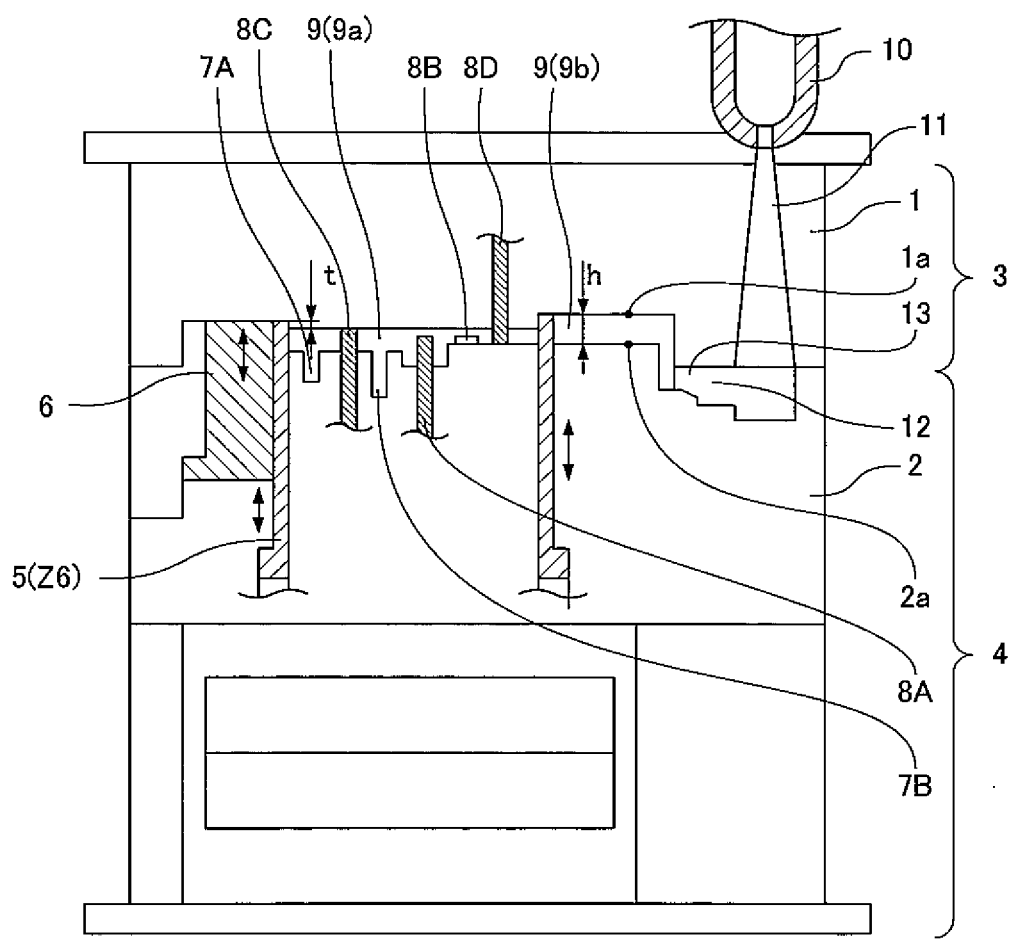
FIG. 9 is a front sectional view showing a die device used for a resin molding method according to a second embodiment of the present invention.
Figure 10:
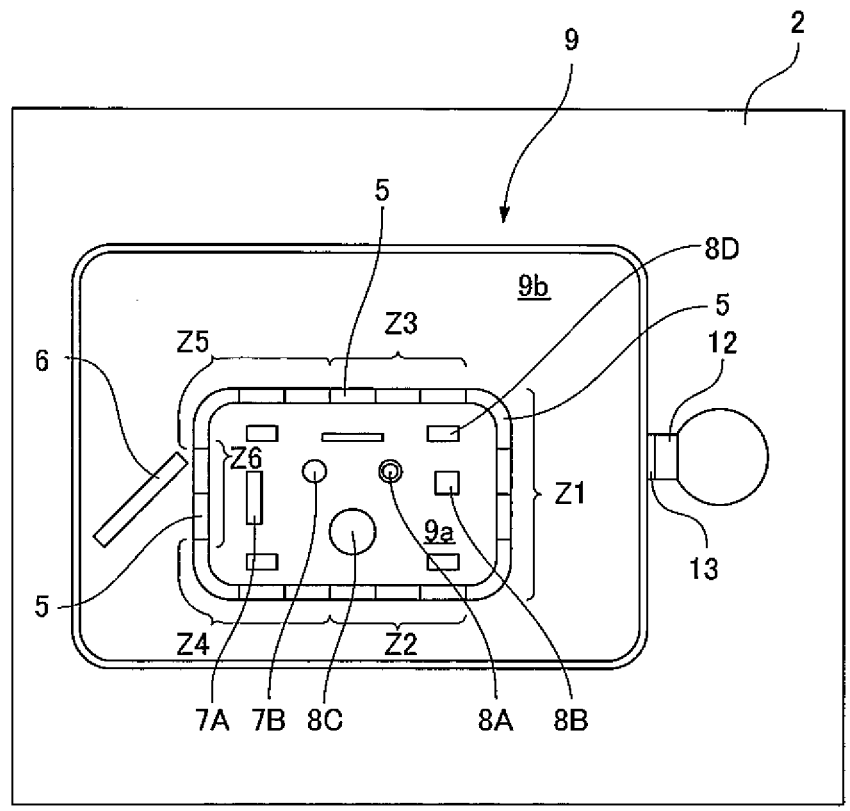
FIG. 10 is a plan view showing the die device used for the resin molding method according to the second embodiment.
Figure 11A:
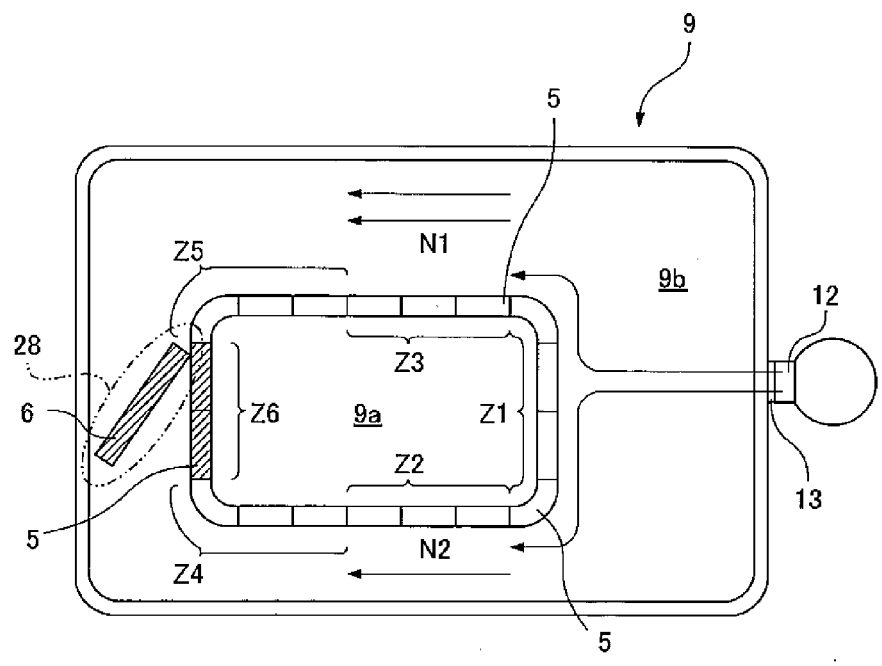
FIG. 11A is a plan view showing a movable die in the steps of the resin molding method according to the second embodiment.
Figure 11B:
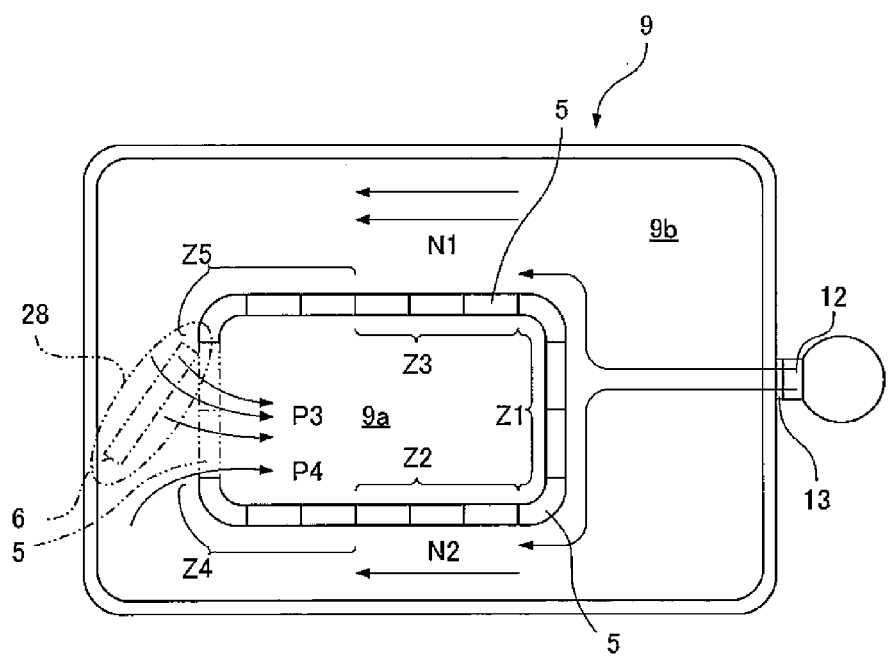
FIG. 11B is a plan view showing the movable die in the steps of the resin molding method according to the second embodiment.
Figure 12A:
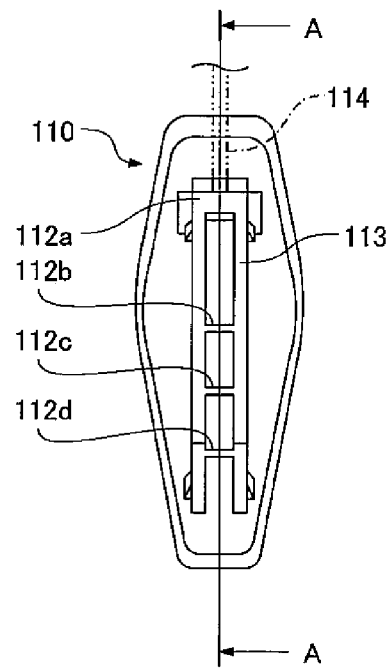
FIG. 12A is a front view showing the backside of a design of a resin molded article according to the related art.
Figure 12B:
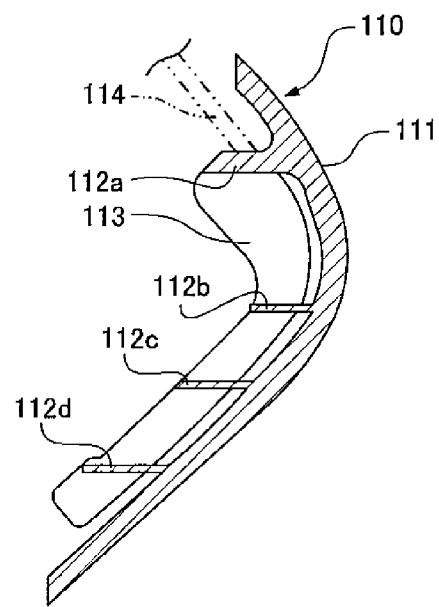
FIG. 12B is a sectional view taken along line A-A of FIG. 12A.
Figure 13A:
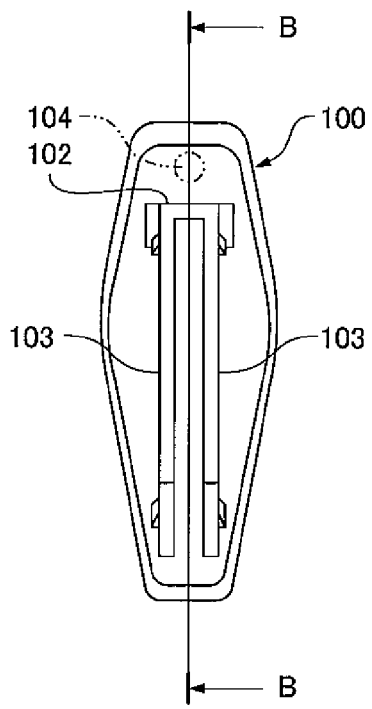
FIG. 13A is a front view showing the backside of a design of another resin molded article according to the related art.
Figure 13B:
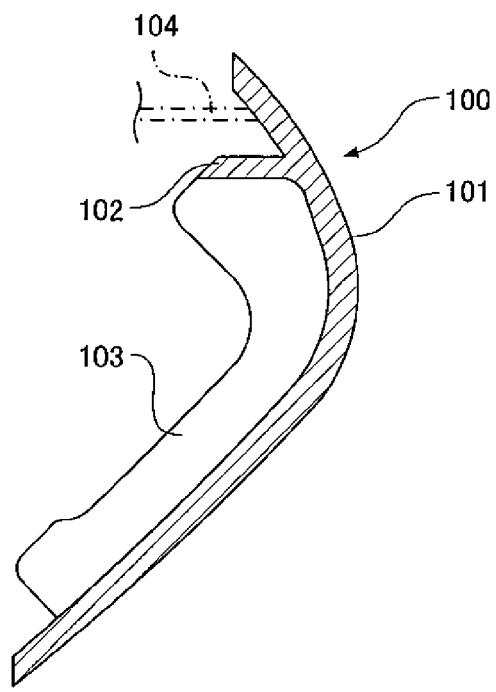
FIG. 13B is a sectional view taken along line B-B of FIG. 13A.
Figure 14:
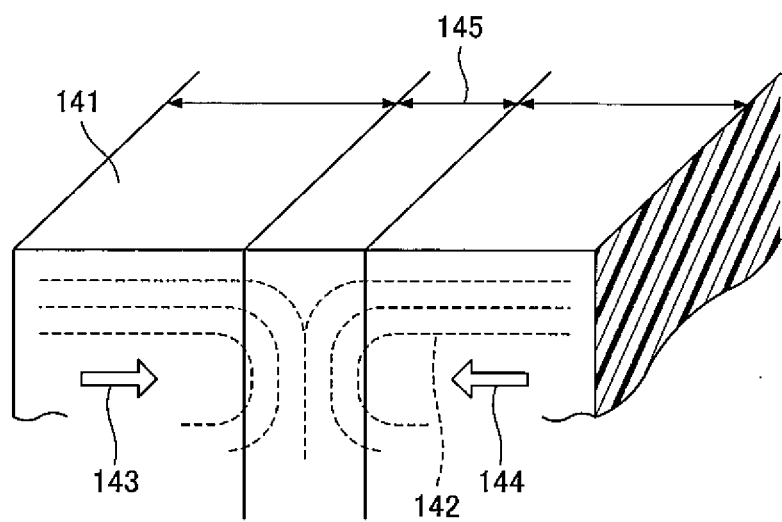
FIG. 14 is an explanatory drawing of a state of orientation lines.
Figure 15:
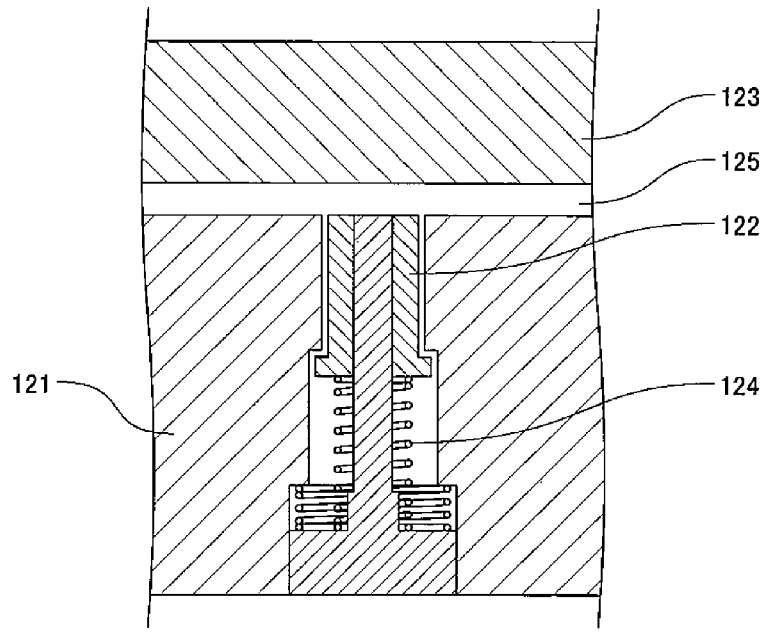
FIG. 15 is a sectional view showing the major part of a die according to the related art.
Figure 16:
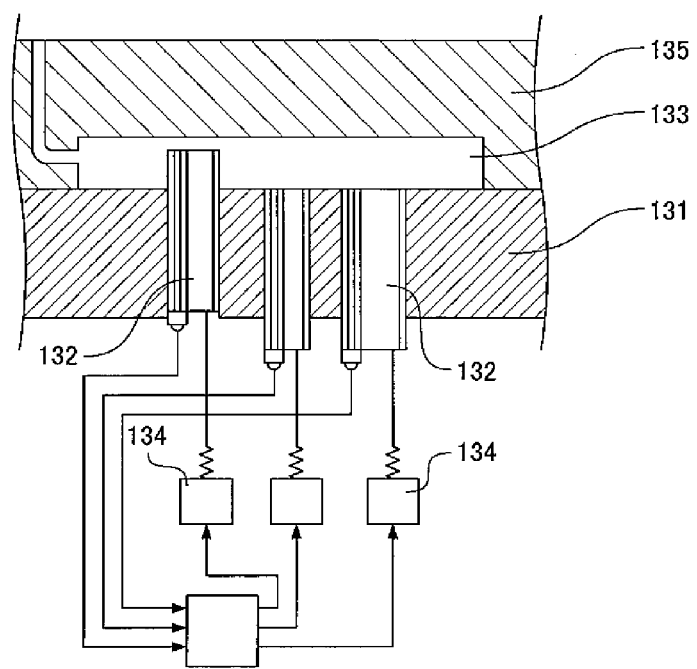
FIG. 16 is a sectional view showing the die of the related art.

FIG. 9 is a front sectional view showing a die device used for the resin molding method and FIG. 10 is a plan view showing a movable die according to the second embodiment of the present invention. FIGS. 11A and 11B are plan views showing the movable die (the cavity of the movable die) in the steps of the resin molding method according to the second embodiment.

As shown in FIGS. 9, 10, 11A, and 11B, in the die device used for the resin molding method according to the second embodiment, flow gates 5 capable of protruding and retracting are disposed as in the die device used for the resin molding method according to the first embodiment. The flow gates 5 prevent molten resin from flowing into an uneven portion forming area 9a of a cavity 9 and cause the molten resin to pass through a design surface forming area 9b and join at a junction 28. At the junction 28, a junction gate 6 capable of protruding and retracting is disposed on a movable die 2. The junction gate 6 protrudes from a surface part 2a of the movable die 2 to a surface part 1a of a fixed die 1 (that is, to a height h of the cavity 9). Molten resin is split by the junction gate 6 with the junction 28 formed along the junction gate 6. In this state, the junction gate 6 is retracted to optionally set the junction 28 and allow the molten resin to join with each other.

The junction gate 6 forms an angle relative to the flow gates 5 in a terminal zone Z6 where molten resin is split and joined. In the present embodiment, the junction gate 6 is inclined such that when the flow gates 5 in the terminal zone Z6 and the junction gate 6 retract to the position of the surface part 2a of the movable die 2, large volume flows N1 and P3 of molten resin are swirly pressed to the flow gates 5 from the outside of small volume flows N2 and P4 of molten resin and the flows N1 and P3 flow into the uneven portion forming area 9a.

In this configuration, molten resin injected from a gate 13 flows in two directions in the design surface forming area 9b having been set by the flow gates 5. The split molten resin joins near the terminal zone Z6 that is a junction part.

Since the junction gate 6 is protruded at the junction 28, the split molten resin flows along the junction gate 6 as shown in FIG. 11A. When the split molten resin reaches the junction gate 6, the junction gate 6 is retracted to the position of the surface part 2a of the movable die 2, so that the molten resin joins with a junction shape set by the junction gate 6 and has welds or orientation lines. After that, the flow gates 5 in the terminal zone Z6 are immediately retracted to the surface part 2a of the movable die 2, so that the molten resin fills the uneven portion forming area 9a over the flow gates 5. At this moment, the junction 28 set by the junction gate 6 forms an angle relative to the flow gate 5, achieving the following effect:

This point will be specifically described below. As has been discussed, the flow gates 5 retracting from the cavity 9 allow molten resin to flow into the uneven portion forming area 9a of the cavity 9. At this moment, the split molten resin come into contact with each other at the junction 28 and thus generates welds or orientation lines in a resin flow pattern. At the junction 28, welds or orientation lines in a resin flow pattern temporarily occur but are reduced by resin flows into the uneven portion forming area 9a of the cavity 9. Since a resin flow to the uneven portion forming area 9a is angled by the junction gate 6, as shown in FIG. 11B, a flowing force is applied in P3 direction at an angle relative to a junction line. Further, when the flow gate 5 in the terminal zone Z6 is retracted to the surface part 2a of the movable die 2, a large volume flow of split molten resin flows into the uneven portion forming area 9a. At this moment, a force is further applied to move the junction line to the flow gates 5 in the terminal zone Z6, thereby reliably reducing welds or orientation lines in a resin flow pattern. Moreover, when molten resin flows in the cavity 9, only the flow gates 5 in the terminal zone Z6 are first retracted, so that the resin flows first from the terminal zone Z6 and surely flows in P3 direction.

After that, flow gates 5 in zones Z5, Z4, Z3, Z2, and Z1 are sequentially retracted starting from the flow gates 5 in the zone Z5 closest to the end of the flow, before the molten resin from the terminal zone Z6 fills the uneven portion forming area 9a. Thus the flow gates 5 surrounding the uneven portion forming area 9a are completely retracted. As shown in FIG. 7, the molten resin flows over the uneven portion forming area 9a and the injection of the molten resin into the uneven portion forming area 9a is completed. In this case, the uneven portion forming area 9a of the cavity 9 contains projecting portions 7A and 7B and recessed portions 8A to 8D that interrupt or split the molten resin, so that welds or orientation lines in a resin flow pattern occur in the uneven portion forming area 9a. As shown in FIG. 7, when resin flows into the uneven portion forming area 9a from the boundary between the uneven portion forming area 9a and the design surface forming area 9b of the cavity 9, the molten resin sequentially flows from the terminal zone Z6 to the zones Z5 to Z1, that is, from a part having a small resin fluid pressure. After flowing from the terminal zone Z6, the molten resin uniformly flows over the uneven portion forming area 9a, so that the resin does not join in the design surface forming area 9b having a design surface and welds or orientation lines in a resin flow pattern do not occur in the design surface forming area 9b.

The mechanism of generating orientation lines in a resin flow pattern at the junction and the effect for completely eliminating orientation lines in a resin flow pattern at the junction are similar to those of the first embodiment and thus the explanation thereof is omitted.

In order to obtain a high-grade metallic appearance without forming welds or orientation lines in a resin flow pattern on the design surface of the appearance, it is necessary to apply resin without passing through projecting portions or recessed portions that may interfere with a resin flow. The method of the second embodiment is also quite suitable for attaining the object.

As has been discussed, according to the present embodiment, even if the appearance surface includes uneven portions 21 such as a hole, it is possible to obtain a high-gloss metallic appearance without forming welds or orientation lines in a resin flow pattern on a design surface 22. Consequently, even a resin molded article with a complicated shape can have a metallic appearance according to the same method without painting.

The second embodiment described the resin molded article having the single gate 13 but the present invention is not limited to this configuration. Also in the case where the gates 13 are provided at multiple points, the flow gates 5 may be disposed at the junction of resin and the driving of the flow gates 5 may be controlled with the same configuration and resin molding method as the flow gates 5 in the terminal zone Z6.

Also in the second embodiment, the flow gates 5 are assembled on the movable die 2. In the case where the movable die 2 has a metallic appearance surface as a design surface forming surface, the flow gates 5 are assembled on the fixed die 1 to implement the same configuration and method. Further, a design surface may be provided on either the fixed die 1 or the movable die 2. Points of welds or orientations lines in a resin flow pattern are located and another component having a design surface is assembled onto the located points by the same configuration and method, so that the flow gates 5 may be disposed on either the fixed die 1 or the movable die 2.

The resin molding method, the die device, and the resin molded article of the present invention can obtain a metallic appearance without forming welds or orientation lines in a resin flow pattern on the design surfaces of exterior components and shells, and are widely applicable to molded components having metallic appearances formed without painting.

What is claimed is:

1. A resin molding method of injecting molten resin into a cavity formed between opposed dies to form a resin molded article, the resin molding method comprising the steps of:
increasing a temperature of at least a die surface facing the cavity to at least a glass transition temperature of resin;
injecting the molten resin into the cavity in a state in which at least one flow gate for restricting a resin flow is protruded into the cavity to restrict the resin flow to a predetermined restricted area, the at least one flow gate being capable of protruding and retracting into/from the cavity;
removing a restriction by retracting the flow gates from the cavity to a position not restricting the resin flow after start of injection in the injecting step;
cooling and solidifying the resin in the cavity; and
collecting the solidified resin from the dies to obtain a resin molded article,
wherein a junction gate is provided at a junction of resin, the junction gate being capable of protruding and retracting into/from the cavity and setting a joint surface to join the resin flow.

2. The resin molding method according to claim 1, wherein the restricted area is an uneven portion forming area containing an uneven portion that splits or blocks the resin flow in the cavity.

3. The resin molding method according to claim 1, wherein the at least one flow gate includes multiple flow gates provided in zones,
the flow gates protruding into the cavity to restrict the resin flow to the restricted area and retracting from the cavity to pass the resin into the restricted area,
the flow gates being sequentially retracted first from the zone closest to a junction of the restricted resin flow.

* * * * *